US012764106B2

(12) United States Patent
Bao

(10) Patent No.: US 12,764,106 B2
(45) Date of Patent: Oct. 13, 2026

(54) METHOD FOR CONNECTION ESTABLISHMENT AND INTERNET OF THINGS (IOT) DEVICE

(71) Applicant: GUANGDONG OPPO MOBILE TELECOMMUNICATIONS CORP., LTD., Guangdong (CN)

(72) Inventor: Yongming Bao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 218 days.

(21) Appl. No.: 18/430,554

(22) Filed: Feb. 1, 2024

(65) Prior Publication Data

US 2024/0179145 A1 May 30, 2024

Related U.S. Application Data

(63) Continuation of application No. PCT/CN2021/111908, filed on Aug. 10, 2021.

(51) Int. Cl.
*G06F 7/04* (2006.01)
*G16Y 10/75* (2020.01)
*G16Y 30/10* (2020.01)
*H04L 9/40* (2022.01)

(52) U.S. Cl.
CPC ............ *H04L 63/083* (2013.01); *G16Y 10/75* (2020.01); *G16Y 30/10* (2020.01); *H04L 63/0823* (2013.01)

(58) Field of Classification Search
CPC .. H04W 12/06; H04L 63/0807; H04L 9/3263; H04L 9/3213; H04L 63/083; H04L 63/0823
See application file for complete search history.

(56) References Cited

U.S. PATENT DOCUMENTS

2019/0037030 A1* 1/2019 Heindl .................... H04L 67/12
2019/0052683 A1* 2/2019 Logue ...................... H04L 67/55
2019/0215319 A1* 7/2019 Hu .......................... G06F 21/30
2019/0281455 A1* 9/2019 Luo ........................ H04W 12/08
(Continued)

FOREIGN PATENT DOCUMENTS

CN 106101147 A 11/2016
CN 106130958 A 11/2016
(Continued)

OTHER PUBLICATIONS

Shen et al. SecDM: Securing Data Migration Between Cloud Storage Systems, Dec. 14, 2011, IEEE, pp. 636-641. (Year: 2011).*
(Continued)

*Primary Examiner* — Philip J Chea
*Assistant Examiner* — Jenise E Jackson
(74) *Attorney, Agent, or Firm* — Ladas & Parry LLP

(57) ABSTRACT

A method for connection establishment and an Internet of Things (IoT) device are disclosed. The method is performed by a configuration device, including: acquiring token information of a service device from a cloud device; and sending the token information to the service device, the token information being configured for establishing a certificate authenticated session establishment (CASE) connection between the service device and the cloud device.

20 Claims, 7 Drawing Sheets

(56) References Cited

U.S. PATENT DOCUMENTS

| | | | | |
|---|---|---|---|---|
| 2020/0126050 | A1* | 4/2020 | Savolainen | H04L 12/14 |
| 2022/0108806 | A1* | 4/2022 | Kommalapati | H04L 69/321 |

FOREIGN PATENT DOCUMENTS

| | | | |
|---|---|---|---|
| CN | 107277061 | A | 10/2017 |
| CN | 110022215 | A | 7/2019 |

OTHER PUBLICATIONS

Khalil et al., Secure Inter Cloud Migration, Apr. 7, 2016, IEEE, pp. 62-67. (Year: 2016).*

0.7-core-spec.pdf ; Standard draft ; May 12, 2021 ; Chapter 6 , Chapter 9 , Chapter 11.

International Search Report and Written Opinion, International Application No. PCT/CN2021/111908, mailed Apr. 24, 2022 (15 pages).

* cited by examiner

METHOD FOR CONNECTION ESTABLISHMENT AND INTERNET OF THINGS (IOT) DEVICE

CROSS REFERENCE TO RELATED APPLICATIONS

The present disclosure is a continuation of International Patent Application No. PCT/CN2021/111908, filed Aug. 10, 2021, the contents of which is herein incorporated by reference in its entirety.

TECHNICAL FIELD

The present disclosure relates to the field of Internet of Things (IoT) technologies, and in particular to a method for connection establishment and an Internet of Things (IoT) device.

BACKGROUND

In an Internet of Things (IoT), a service device may be managed and controlled by a configuration device.

In related art, the service device may be configured with network configuration through the configuration device so that the service device may access the network. Then, the service device may establish an internet connection with the configuration device, and receive management and controls by the configuration device through the internet connection.

However, since management and controls by the configuration device on the service device is only concerned in related art, an application scenario may be greatly limited, which influence the convenience of the management and the controls of the service device.

SUMMARY OF THE DISCLOSURE

In a first aspect, some embodiments of the present disclosure provide a method for connection establishment, the method is performed by a configuration device, and the method may include: acquiring token information of a service device from a cloud device after establishing a connection with the service device; and sending the token information to the service device, the token information being configured for establishing a certificate authenticated session establishment (CASE) connection between the service device and the cloud device.

In a second aspect, some embodiments of the present disclosure provide a method for connection establishment, the method is performed by a service device, and the method may include: receiving token information of the service device sent by the configuration device, the token information being acquired by the configuration device from the cloud device; and establishing a CASE connection with the cloud device based on the token information.

In a third aspect, some embodiments of the present disclosure provide an Internet of Things (IoT) device. The IoT device is realized as a configuration device, and the IoT device includes a processor, a memory, and a transceiver.

The transceiver may be configured to obtain token information of a service device from a cloud device after establishing a connection with the service device.

The transceiver may be further configured to send the token information to the service device. A CASE connection is established between the service device and the cloud device based on the token information.

BRIEF DESCRIPTION OF THE DRAWINGS

In order to clearly illustrate the technical solutions in the present disclosure, the following briefly illustrates drawings associated with embodiments of the present disclosure. Obviously, the drawings described as follows are only for some embodiments of the present disclosure. For an ordinary skilled in the art, other drawings may be derived based on the following drawings without creative work.

DETAILED DESCRIPTION

To clarify the purposes, technical solutions, and advantages of the present disclosure, various embodiments of the present disclosure will be further described in detail based on the drawings.

A network architecture and a service scenario illustrated in the embodiments of the present disclosure are provided to explain the technical solutions in the embodiments of the present disclosure more clearly, and are not limited the technical solutions in the embodiments of the present disclosure. Those ordinary skilled in the art may understand that the technical solutions in the embodiments of the present disclosure are still applicable for similar technical problem as the network architecture evolves and a new service scenario emerges.

Figure 1:
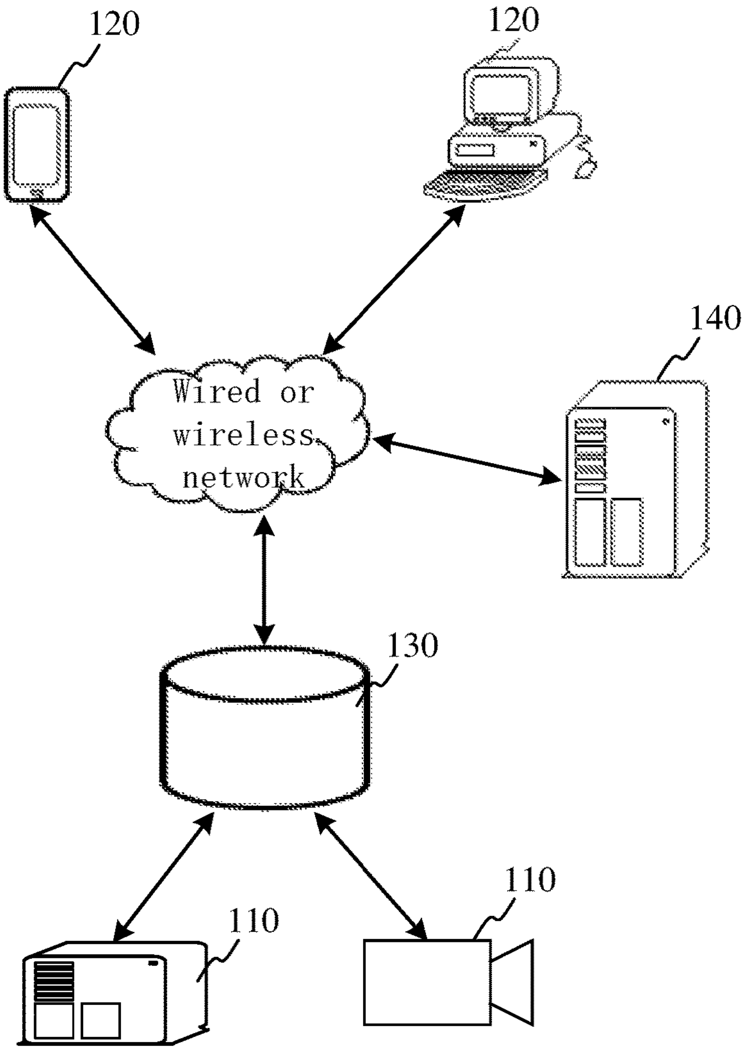
FIG. 1 is a schematic view of a network architecture of an Internet of Things (IoT) according to an embodiment of the present disclosure.

FIG. 1 is a schematic view of a network architecture of an Internet of Things (IoT) according to an embodiment of the present disclosure. The network architecture may include a service device 110 and a configuration device 120. In some embodiments, the network architecture may further include a gateway device 130, a cloud server 140, and so on.

The service device 110 may be a device configured to provide a function service of the IoT.

In some embodiments, the service device 110 may be a smart home device, such as a smart light, a smart TV, a smart air conditioner, a smart refrigerator, a smart microwave, a smart rice cooker, and a robot vacuum.

In some embodiments, the service device 110 may be a device for industrial production, such as a lathe, an industrial robot, a solar panel, and a wind turbine.

In some embodiments, the service device 110 may be a device for a business service, such as a vending machine.

In some embodiments, the service device 110 may be a smart surveillance device, such as a surveillance camera, an infrared sensor, a sound sensor, and a temperature sensor.

In a possible embodiment, the configuration device 120 may be a terminal device at a user-side, such as a smart phone, a tablet, a smart watch, and a smart TV. Alternatively, the terminal device may further be a desktop computer, a portable computer, and a personal work station.

In another possible embodiment, the configuration device 120 may be a client entity (which may be a virtual entity). For example, the configuration device 120 may be an application (APP) that is operated in the terminal device for accessing, controlling, managing, and etc.

The gateway device 130 may be a network device that realizes an internetworking over a network layer, also known as an inter-network connector, a protocol converter, and so on. The gateway device 130 may provide a network connection service for the service device 110.

The gateway device 130 may be a professional gateway, such as a residential gateway. Alternatively, the gateway device 130 may be an access device with a gateway function, such as a router with the gateway function.

In a possible embodiment, the gateway device 130 may be implemented as the configuration device 120.

The cloud server 140 may be a server deployed at a network side.

In the embodiments of the present disclosure, the service device 110, the configuration device 120, the gateway device 130, and the cloud server 140 may be IoT devices that satisfy an industry standard. For example, they may be IoT devices that satisfies a connected home over IP working group (CHIP) standard under a Zigbee Alliance (also referred to as Matter).

In the embodiments of the present disclosure, a secure connection may be established between the service device 110 and the configuration device 120, for example, based on the CHIP standard.

The service device 110 and the gateway device 130 may be connected to each other through a wired network or a wireless network. The cloud server 140 may be connected to the gateway device 130 and the configuration device 120 respectively through the wired network or the wireless network.

In some embodiments, the wired network or the wireless network that are mentioned above may adopt a standard communication technology and/or protocol. For example, the wired network or the wireless network that are mentioned above may be a communication network based on an IoT protocol.

Figure 2:
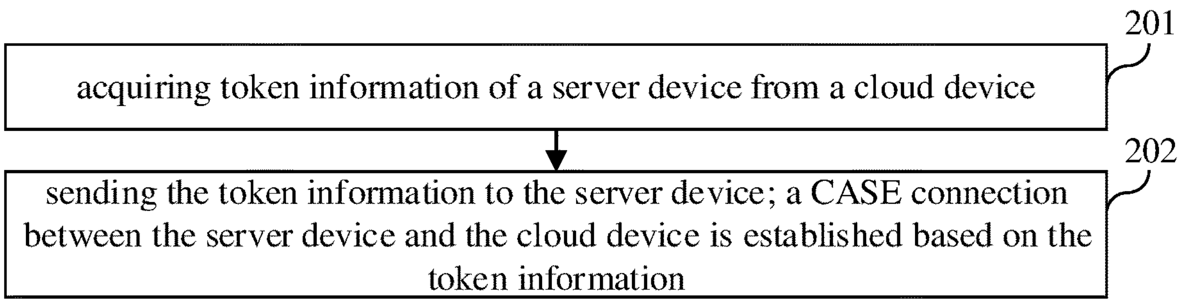
FIG. 2 is a flowchart of a method for connection establishment according to an embodiment of the present disclosure.

FIG. 2 is a flowchart of a method for connection establishment according to an embodiment of the present disclosure. The method may be performed by a configuration device, for example, the configuration device 120 of the network architecture illustrated in FIG. 1. The method may include the following operations.

At block 201: the method acquires token information of a service device from a cloud device.

After establishing a connection with the service device, the configuration device may acquire the token information of the service device from the cloud service.

In a possible embodiment, the connection between the configuration device and the service device may be a certificate authenticated session establishment (CASE) connection.

The CASE connection may be a session connection in which data messages are securely encapsulated based on a transmission control protocol (TCP) or a user datagram protocol (UDP). A more secure data transmission may be performed by the CASE connection based on the TCP/UDP.

The configuration device may have a user account to be logged, and the user account may be obtained by registering at the cloud device in advance. The configuration device that have the user account to be logged may have an authority to perform an IoT-related information interactions with the cloud device, such as accessing the cloud device, managing or controlling service devices managed by the cloud device, assisting the service device to establish a connection with the cloud device.

For example, when assisting the service device to establish a connection with the cloud device, the configuration device may request the token information corresponding to the service device from the cloud server, after a connection is established between the configuration device and the service device.

At block 202, the method sends the token information to the service device. The token information is configured for establishing a CASE connection between the service device and the cloud device.

The service device may receive the token information through the connection established with the configuration device (e.g., a CASE connection with the configuration device).

After acquiring the token information corresponding to the service device from the cloud device, the configuration device may send the token information to the service device. The service device may subsequently establish a secure connection, i.e., the above-described CASE connection, with the cloud device based on the token information.

In the technical solutions provided by the embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

Figure 3:
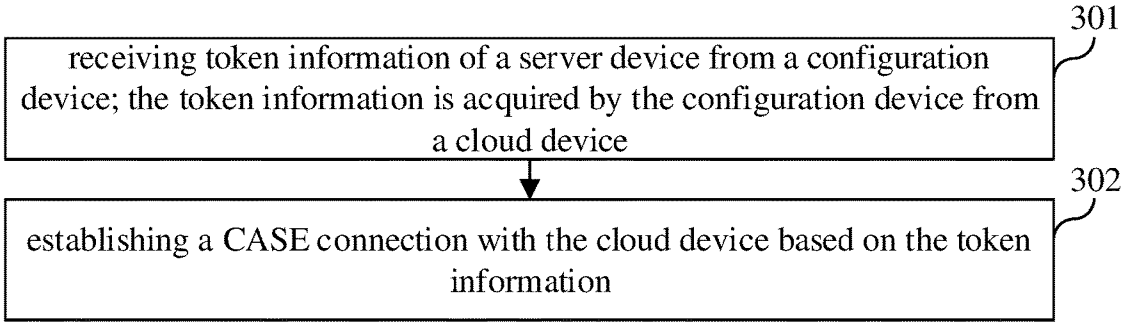
FIG. 3 is a flowchart of a method for connection establishment according to an embodiment of the present disclosure.

FIG. 3 is a flowchart of a method for connection establishment according to an embodiment of the present disclosure. The method may be performed by a service device, for example, the service device 110 of the network architecture illustrated in FIG. 1. The method may include the following operations.

At block 301, the method receives token information of the service device from a configuration device; the token information is acquired by the configuration device from a cloud device.

In a possible embodiment, the operation at the block 301 may be performed after the service device establishes a connection (e.g., a CASE connection) with the configuration device.

At block 302, the method establishes a CASE connection with the cloud device based on the token information.

In the technical solutions provided by the embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

Figure 4:
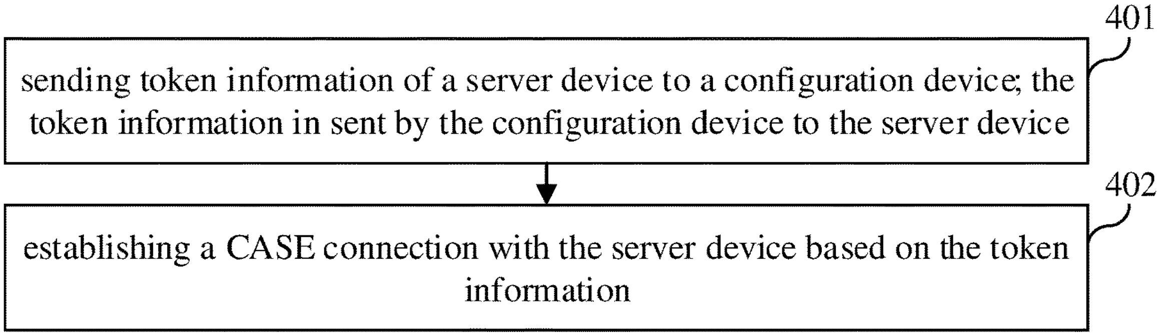
FIG. 4 is a flowchart of a method for connection establishment according to an embodiment of the present disclosure.

FIG. 4 is a flowchart of a method for connection establishment according to an embodiment of the present disclosure. The method may be performed by a cloud device, for example, the cloud device 140 of the network architecture illustrated in FIG. 1. The method may include the following operations.

At block 401, the method sends token information of a service device to a configuration device. Thus, the configuration device sends the token information to the service device.

In a possible embodiment, the operation at the block 401 may be performed after the service device establishes a connection (e.g., a CASE connection) with the configuration device.

At block 402, the method establishes a CASE connection with the service device based on the token information.

In the technical solutions provided by the embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

In a possible embodiment, after the configuration device sends the token information to the service device, the service device may establish a secure connection with the cloud device directly.

Figure 5:
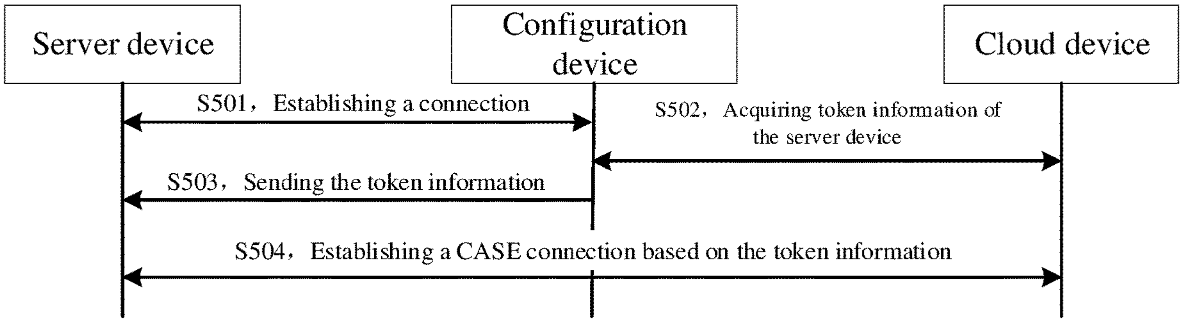
FIG. 5 is a flowchart of a method for connection establishment according to an embodiment of the present disclosure.

FIG. 5 is a flowchart of a method for connection establishment according to an embodiment of the present disclosure. The method may be performed by interactions among a configuration device, a service device, and a cloud device, and may include the following operations.

At block 501, the configuration device establishes a connection with a service device.

In the embodiments of the present disclosure, a secure connection, for example, a CASE connection, may be established between the configuration device and the service device.

The establishing a secure connection between the configuration device and the service device may include the following operations.

Operation A: Scanning and Pairing.

At operation A1, the service device (e.g., device) provides a QR code, and the configuration device (e.g., commissioner) obtains a personal identification number code (PIN code), a Rendezvous mode, and other information of the service device by scanning the QR code of the service device.

At operation A2, the configuration device establishes a connection with the service device in the corresponding mode based on the Rendezvous mode provided by the service device.

At operation A3, after the configuration device establishes the connection with the service device, the service device enters a pending pairing state. The configuration device sends a request for password-based key derivation function (PBKDF) parameters, and the service device receives and then handles the request and then returns a PBKDF response. The configuration device receives the PBKDF response and sends a pake1 message with a spake2+ to the configuration device. The service device receives and handles the pake1 message, and sends a pake2 message with the spake2+ to the configuration device. The configuration device receives and handles the pake2 message, and sends a pake3 message with the spake2+ to the service device to establish a password authenticated session establishment (PASE) session. The service device receives and handles the pake3 message, and establishes the PASE session.

Operation B: Network Configuration and Domain Name System (DNS) Service Discovery (DNS-SD).

At operation B1, after establishing a PASE connection with the service device, the configuration device starts to perform a device authentication process on the service device.

First, the configuration device sends a request for acquiring a device authentication certificate chain to the service device, and the service device returns a corresponding certificate chain after receiving the request. Then, the configuration device creates a random number nonce, and sends a device authentication request to the service device, which carries the random number nonce. After receiving the device authentication request, the service device creates a tag-length-value (TLV) structure of an authentication data and returns the data to the configuration device. Finally, the configuration device performs the device authentication based on the returned data.

At operation B2, after the authentication process for the service device is performed successfully, the configuration device sends a root certificate (which is from the Root CA) to the service device. The root certificate of the configuration device is issued by an ecology of the configuration device. After receiving the root certificate, the service device sends an acknowledgment message of successfully receiving the root certificate to the configuration device. Then, the configuration device creates the nonce for an operational certificate signing request (OpCSR), and sends a request for OpCSR to the service device, which carries the nonce. The service device receives the request, generates a corresponding operational password pair, creates a TLV structure of a data corresponding to the OpCSR, and sends the data to the configuration device. The configuration device then performs OpCSR authentication based on the received data. Finally, the configuration device generates an operational certificate for the service device after passing the OpCSR authentication, and sends the certificate to the service device. The service device returns an acknowledgement message to the configuration device after receiving the certificate.

At operation B3, after passing authentication on the service device, the configuration device starts to perform network configuration for the service device by sending a network access credential, including a service set identifier (SSID) and a password (PWD), to the service device. The service device is automatically connected to the network once receiving the network access credential. After the service device is successfully connected to the network, the configuration device and the service device exit the PASE session. The service device publishes an own domain name through the DNS-SD. The configuration device discovers the service device through the DNS-SD and establishes an IP-based connection with the service device.

Operation C: Establishing a CASE Session.

After the configuration device and the service device establish the IP-based connection, the service device waits for a CASE session to be established. The configuration device sends a SigmaR1 to the service device, the service device receives and handles the SigmaR1, and the service device sends a SigmaR2 to the configuration device. The configuration device receives and handles the SigmaR2, sends a SigmaR3 to the service device, and then establishes the CASE session. The service device receives and handles the SigmaR3, and then establishes the CASE session.

At operation 502, the configuration device acquires token information of the service device from a cloud device. Accordingly, the cloud device sends the token information of the service device to the configuration device.

In a possible embodiment, after the configuration device establishes the connection with the service device, or, during a process of establishing the connection with the service device, the configuration device may send a token acquisition request, including first verification information, to the cloud device, when acquiring the token information of the service device from the cloud device. The cloud device receives the token acquisition request sent by the configuration device, and verifies the token acquisition request based on the first verification information. After the first verification information is successfully verified, the cloud device sends the token information to the configuration device. The configuration device acquires the token information sent by the cloud device after the first verification information is successfully verified.

In the embodiments of the present disclosure, to enhance a security of a token issuance and a security of a subsequent connection establishment between the cloud device and the service device, the token acquisition request sent by the configuration device to the cloud device may include the first verification information. The cloud device may verify the token acquisition request based on the first verification information. If the token acquisition request is successfully verified, the cloud device may generate the token information for the service device, and send the generated token information to the configuration device.

In a possible embodiment, the first verification information may include at least one of a user information of the configuration device and a fabric identity (fabric ID) of the service device.

In a possible embodiment, the fabric ID is generated for the service device based on the root certificate of the cloud device. The fabric ID is configured for the cloud device to obtain a verification result. The verification result is configured to indicate whether the fabric ID is generated based on the root certificate of the cloud device.

A process where the cloud device verifies the token acquisition request based on the first verification information may include: verifying whether a user information is legitimate, when the first verification information includes the user information of the configuration device; and verifying whether the fabric ID is matched with the root certificate of the cloud device, when the first verification information includes the fabric ID of the service device.

In a possible embodiment, when the first verification information includes the fabric ID of the service device, the cloud device may obtain a verification result based on the fabric ID, and the verification result is configured to indicate whether the fabric ID is generated based on the root certificate.

A user corresponding to a user account to be logged in the configuration device may register and link to the cloud device in advance, during which the corresponding user information may be stored in the cloud device. In addition, the cloud device may also issue its own root certificate to the configuration device that logs into the user account. The configuration device may generate a fabric ID corresponding to the root certificate of the cloud device. The fabric ID of the service device corresponds to the root certificate of the cloud device.

In some embodiments, the configuration device may generate a fabric ID for the service device based on the root certificate of the cloud device. The fabric ID is matched with a chip-fabric-id in the root certificate of the cloud device. When sending the token acquisition request, the configuration device may take at least one of the user information and the fabric ID as the first verification information to be carried in the token acquisition request to be sent.

In some embodiments, if the first verification information includes the user information and the fabric ID, the cloud device may first verify the user information to determine whether the user information is legitimately registered. After the user information is successfully verified, the cloud device may then verify the fabric ID to determine whether the fabric ID is matched with the root certificate of the cloud device. For example, the verification result may be obtained by comparing the fabric ID with the root certificate of the cloud device, and the verification result is configured to indicate whether the fabric ID is generated based on the root certificate. If the fabric ID is generated based on the root certificate, it is determined to pass verification on the first verification information; otherwise, it is determined to fail to pass verification on the first verification information.

In a possible embodiment, the configuration device may acquire the token information of the service device from the cloud device after the service device has completed configuration.

In another possible embodiment, the configuration device acquires the token information of the service device from the cloud device after a PASE connection between the service device and the configuration device is established, an authentication process for the service device is performed successfully, and an operation process for operational certificate signing request (OpCSR) is performed successfully, and before network configuration for the service device is completed.

That is, in the embodiments of the present disclosure, when the service device establishes a connection with the configuration device, before the service device completes the network configuration, as long as the an operation process for OpCSR between the service device and the configuration device is successfully performed, the configuration device may start a process of requesting the token information of the service device from the cloud device, without waiting for the network configuration of the service device to be completed. After the service device completes the network configuration, the service device may establish the CASE connection with the cloud device timely, so that a duration for establishing the CASE connection between the service device and the cloud device is reduced, an efficiency of establishing the CASE connection between the service device and the cloud device is improved.

In a possible embodiment, the token information includes a device token.

The device token is configured to verify an authority of the service device for establishing the CASE connection with the cloud device, during a process where the service device starts to establish the CASE connection with the cloud device.

In a possible embodiment, the token information further includes at least one of a refresh token and an address of the cloud device.

The refresh token is configured to refresh the device token.

In order to enhance the security of establishing the CASE connection, the device token of the service device usually has a certain time limit. In the embodiments of the present disclosure, to avoid reacquiring a new device token from the cloud device after the device token expires, the refresh token is issued along with the device token and is configured to update the expired device token, so that interaction steps involved in the token issuance may be reduced, a network resource may be saved, and an efficiency of the token issuance may be improved.

In a possible embodiment, the token acquisition request further includes a node ID of the service device, and the cloud device generates the device token and/or the refresh token based on the node ID.

A process where the cloud device sends the token information to the configuration device after the cloud device passes verification on the first verification information may include: generating the device token of the service device and/or the refresh token of the service device based on the node ID after the cloud device passes verification on the first verification information; and sending the token information including the device token and/or the refresh token to the configuration device.

In the embodiments of the present disclosure, after passing verification on the token acquisition request based on the first verification information, the cloud device may generate the device token and/or the refresh token in the token information corresponding to the service device based on the node ID.

In some embodiments, when generating the token information based on the node ID, the cloud device may add the node ID or derivative information of the node ID (e.g., a hash value of the node ID) into the device token and/or refresh token.

When generating the token information based on the node ID, the cloud device may further store the node ID and the generated token information correspondingly.

In a possible embodiment, the cloud device adopts an Octet String with a length of 8 or 16 as the above-mentioned device token, which is generated by a cryptographic signature algorithm and using the node ID, alternatively, in combination with data forming by the Fabric ID, a timeout, and the nonce (random number). The cloud device may then verify the token issued by the service device according to the signature algorithm, to confirm whether the token is the one sent to the corresponding service device.

The refresh token is generated by the cloud device for the corresponding Node ID. If a token timeouts, the service device can use the refresh token to request a new token.

At operation 503, the configuration device sends the token information to the service device, and the service device receives the token information.

In the embodiments of the present disclosure, after receiving the token information sent by the cloud device, the configuration device may send the token information to the service device.

In a possible embodiment, a process where the configuration device sends the token information to the service device may include sending a write operation message, including the token information, to the service device. The write operation message is configured to instruct the service device to write the token information into a model information cluster in the service device; the model information cluster is configured to store information related to a cloud operation. In other words, the model information cluster is configured to configure and store data that interoperates with the cloud.

In a possible embodiment, the write operation message is configured to instruct the service device to write the token information into attribute information in the model information cluster.

Accordingly, a process where the service device receives the token information of the service device sent by the configuration device may include: receiving the write operation message, the write operation message being sent by the configuration device and including the token information; and writing the token information into the model information cluster in the service device based on the write operation message.

In the embodiments of the present disclosure, a cluster of system models or device management models may be arranged in the service device, and the cluster may be configured to store the token information sent by the cloud device. After receiving the token information of the service device from the cloud device, the configuration device may instruct the service device to write the token information into the cluster in the service device.

Accordingly, the service device writes the token information to the cluster in the service device.

The model information cluster in the service device includes an attribute corresponding to a respective information item in the token information. The service device writes a respective information item in the token information into a corresponding attribute.

In a possible embodiment, the cluster may store key attributes, such as a cloud address attribute, a token attribute, and a refresh token attribute. Accordingly, the service device writes the device token in the token information into the token attribute, writes the refresh token in the token information into the refresh token attribute, and writes the address of the cloud device in the token information into the cloud address attribute.

Each of the attributes includes information, such as an attribute name, an attribute type, and an attribute value. The attribute value includes a corresponding attribute content. For example, an attribute value of the cloud address attribute is the address of the cloud device, an attribute value of the token attribute is the device token, and the attribute value of the refresh token attribute is the refresh token.

For example, at least three key attributes are included in the model information cluster in the cloud device. An attribute type of the cloud address attribute is a String, described as Cloud URL, and an attribute value of the cloud address is an address or a domain name of the cloud device. An attribute type of the token attribute is an Octet String, described as Cloud token, and an attribute value of the token attribute is the device token sent by the cloud device. An attribute type of the refresh token attribute is an Octet String, described as Cloud refresh token, and an attribute value of the refresh token attribute is the refresh token sent by the cloud device.

At operation 504, the service device establishes a CASE connection with the cloud device based on the token information.

In the embodiments of the present disclosure, after receiving the token information, the service device may start a process of connection establishment with the cloud service based on the token information.

In a possible embodiment, the process of establishing the CASE connection between the service device and the cloud device based on the token information may include the following operations.

At operation 504*a*, the service device sends a first connection establishment request to the cloud device, and the cloud device receives the first connection establishment request sent by the service device. The first connection establishment request includes a first connection establishment message (i.e., SigmaR1) and a device token of the service device.

The device token is configured for the cloud device to verify the connection establishment request sent by the service device.

In the embodiments of the present disclosure, the service device may send the first connection establishment request, including the SigmaR1 and the device token, to the cloud device after completing network configuration.

After sending the first connection establishment request to the cloud device, the service device may establish a TCP connection or a UDP connection with the cloud device based on the address of the cloud device. Accordingly, the first connection establishment request may be transmitted between the service device and the cloud device through the TCP/UDP connection.

In the embodiments of the present disclosure, when the UDP connection is configured between the service device and the cloud device, a connected home over IP working group reliable message protocol (CRMP) may be adopted to ensure a reliability for data transmission.

At operation 504*b*, After the cloud device passes verification on the SigmaR1 through the device token, the cloud device returns a second connection establishment message (i.e., SigmaR2) to the service device based on the SigmaR1. Accordingly, the service device receives the SigmaR2 returned by the cloud device based on SigmaR1.

In the embodiments of the present disclosure, the cloud device may verify the device token in the first connection establishment request to determine whether the device token is generated by the cloud device for the service device. If so, verification on the SigmaR1 is passed. Otherwise, verification on the SigmaR1 is passed, and at this time, alternatively, the cloud device may return a response, indicating a failure in the connection establishment, to the service device.

In a possible embodiment, during the verification, the cloud device may verify whether the device token carried in the first connection establishment request satisfies a device token format or rule issued by the cloud. If so, it may be determined that the device token is a legitimate device token issued by the cloud device.

In another possible embodiment, the first connection establishment request may further carry device information of the service device, for example, the node ID or the fabric ID of the service device. The cloud device may query the device token issued to the service device based on the device information and compare the queried device token with the device token carried in the first connection establishment request. If the queried device token and the device token carried in the first connection establishment request are matched, it is determined that verification on the SigmaR1 is passed, and otherwise, the verification on the SigmaR1 is not passed.

After passing the verification on the SigmaR1, the cloud device may handle the SigmaR1, generate the SigmaR2, and return the SigmaR2 to the service device through the TCP/UDP connection.

At operation 504*c*, the service device sends a second connection establishment request to the cloud device based on the SigmaR2, and the cloud-side device receives the second connection establishment request sent by the service device. The second connection establishment request includes a third connection establishment message (i.e., SigmaR3) and the device token of the service device.

In the embodiments of the present disclosure, after receiving the SigmaR2 returned by the cloud device, the service device handles the SigmaR2, generates the SigmaR3, and sends a second connection establishment request, including the SigmaR3 and the device token, to the cloud device.

At operation 504*d*, the service device establishes a CASE connection with the cloud device. Accordingly, the cloud device establishes the CASE connection with the service device after passing verification on the SigmaR3 through the device token.

The CASE connection between the service device and the cloud device may be established at a side of the service device after the service device sends the second connection establishment request, including the SigmaR3 and the device token, to the cloud device. For example, information (e.g., context information) related to the CASE connection between the cloud device and the service device may be generated at the side of the service device.

After receiving the second connection establishment request, the cloud device verifies the SigmaR3 through the device token carried in the second connection establishment request. After verification on the SigmaR3 is passed, the CASE connection between the cloud device and the service device may be generated at a side of the cloud device.

In a possible embodiment, after the CASE connection is established between the service device and the cloud device, the service device sends a resource upload request to the cloud device, and accordingly, the cloud device receives the resource upload request sent by the service device through the CASE connection. The resource upload request includes resource information and the device token of the service device.

The cloud device may verify the resource information through the device token, and then establish a digital image of the service device based on the resource information uploaded by the service device after passing verification on the resource information through the device token. Thus, the cloud device or other remote devices may manage and control the service device through the digital image.

Figure 6:
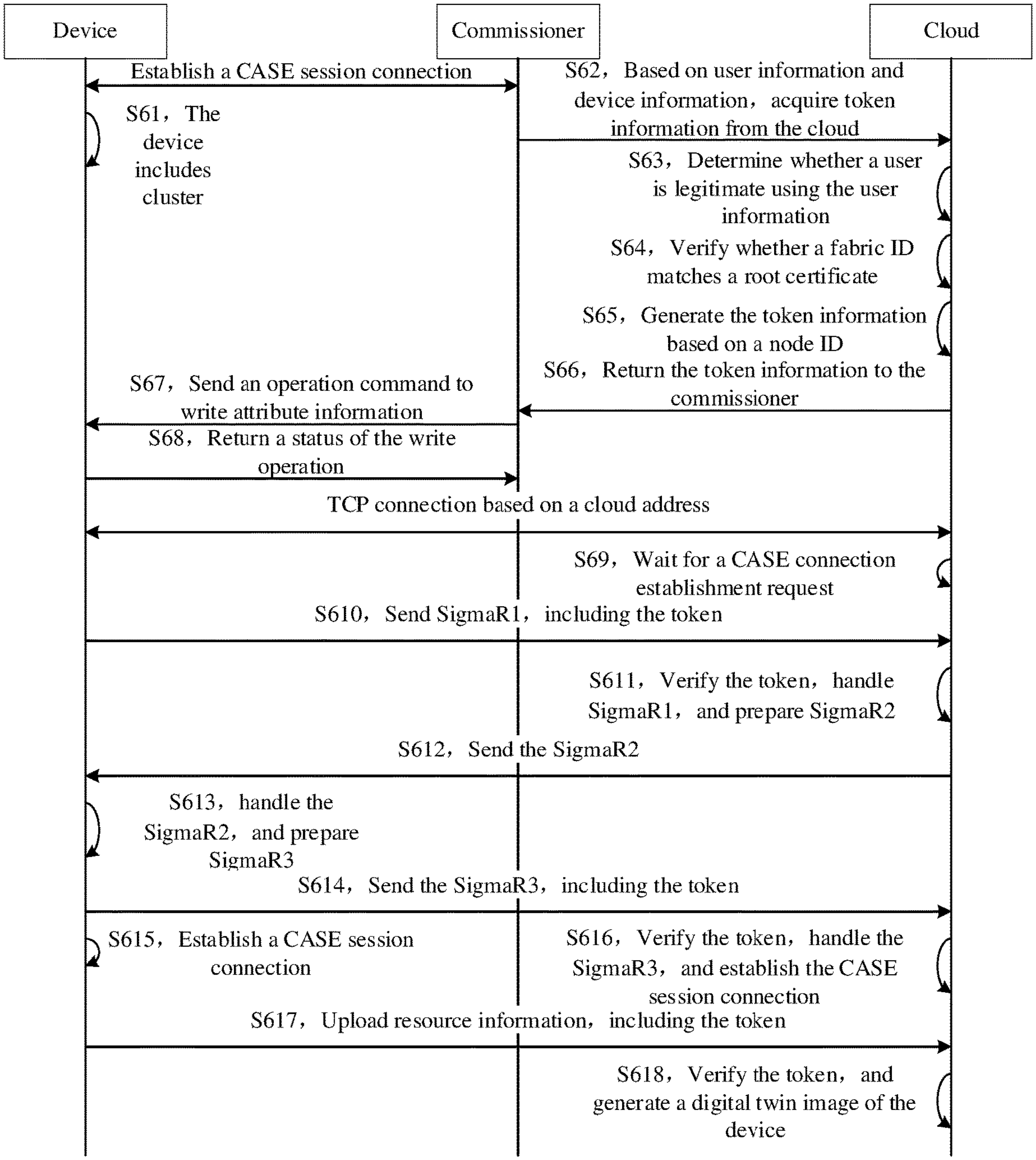
FIG. 6 is a timing diagram of establishing a CASE connection according to an embodiment illustrated in FIG. 5.

For example, FIG. 6 is a timing diagram of establishing a CASE connection according to an embodiment of the present disclosure. In FIG. 6, a process of establishing a CASE connection between the service device and the cloud device may include the following operations.

At operation S61, the device (refer to as the service device) includes a cluster of system models or device management models (refer to as a cloud cluster in the embodiments of the present disclosure), which is configured to configure and store data that interoperates with the cloud (e.g., the above-described cloud device). The cluster at least includes a cloud address attribute, a token attribute, a refresh token attribute, and other attribute information.

At operation S62, when a CASE session connection is established between the device and a commissioner (refer to as the above-described configuration device), the commissioner acquires a token (refer to as the above-described device token) and a refresh token (refer to as the above-described refresh token) of the device from the cloud based on registered user information and device information such as a node ID (refer to as the above-described node ID) and a fabric ID (refer to as the above-described fabric ID). That is, the commissioner sends a token acquisition request to the cloud.

At operation S63, the cloud determines whether it is a legitimate user based on the user information sent by the commissioner.

At operation S64, the cloud verifies whether the fabric ID is matched with the root certificate.

For example, the cloud compares the fabric ID (generated by the commissioner for the device) sent by the commissioner with the root certificate of the cloud to determine that the fabric ID is generated by the root certificate of the cloud.

At operation S65, the cloud generates token information such as token and refresh token for the device based on the node ID sent by the device.

At operation S66, the cloud returns token and refresh token (token information) to the commissioner.

At operation S67, the commissioner sends an operation command to the device to write the cloud address attribute, the token attribute, the refresh token attribute, and other attribute information of the cloud cluster.

At operation S68, after receiving the operation command to write the cloud cluster, the device writes the corresponding attributes and returns a write operation state to the commissioner.

At operation S69, the device establishes a TCP/UDP connection with the cloud based on the cloud address. The cloud waits for a request for CASE connection establishment through the corresponding token.

At operation S610, the device sends SigmaR1, including the token, to the cloud.

At operation S611, after the cloud receives SigmaR1 and passes verification on the token, the cloud handles SigmaR1 and prepares SigmaR2.

At operation S612, the cloud sends the SigmaR2 to the device.

At operation S613, the device handles the SigmaR2 message from the cloud and prepares SigmaR3.

At operation S614, the device sends the SigmaR3, including the token, to the cloud.

At operation S615, the device establishes a CASE session connection.

At operation S616, after the cloud receives the SigmaR3 and passes verification on the token, the cloud handles the SigmaR3, and then establishes the CASE session connection.

At operation S617, after the CASE session connection is successfully established between the device and the cloud, the device spontaneously uploads resource information of the device, including the token, to the cloud.

At operation S618, the cloud verifies the token and generates a digital twin image of the device at the cloud.

One or more of the operations S61 to S618 above may be performed after a PASE connection is established between the device and the commissioner, an authentication process for the device is performed successfully, and an operation process for operational certificate signing request (OpCSR) is performed successfully, and before network configuration for the device is completed. Alternatively, one or more of the operations S61 to S618 above may be performed after network configuration for the device is completed.

In the embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

Besides, in the embodiments of the present embodiments, the configuration device obtains the token information of the service device from the cloud device, and send the token information of the service device to the service device. A CASE connection between the service device and the cloud device may be established directly based on the token information, and thus the efficiency of establishing the CASE connection may be improved.

In a possible embodiment, after the configuration device sends the token information to the service device, the service device may directly establish a secure connection with the cloud device through the configuration device.

Figure 7:
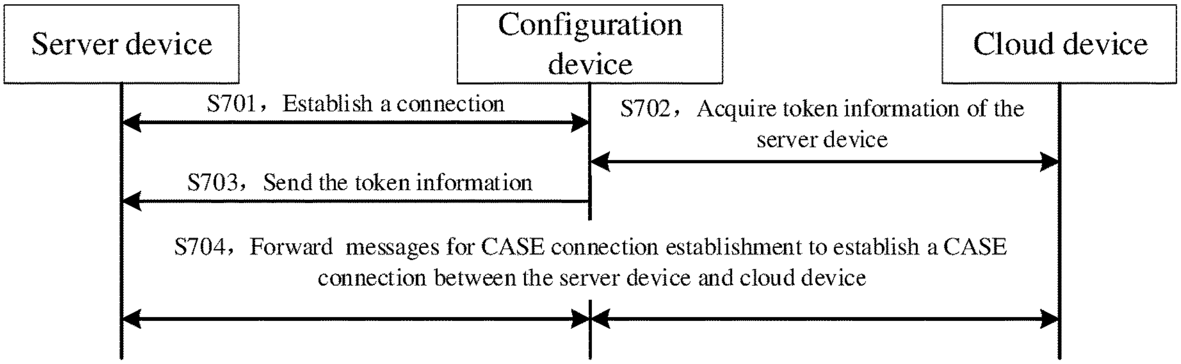
FIG. 7 is a flowchart of a method for connection establishment according to an embodiment of the present disclosure.

FIG. 7 is a flowchart of a method for connection establishment according to an embodiment of the present disclosure. The method may be performed by interactions among the configuration device, the service device, and the cloud device. The method may include the following operations.

At operation 701, The configuration device and the service device establish a connection.

At operation 702, the configuration device acquires the token information of the service device from the cloud device, and accordingly, the cloud device sends the token information of the service device to the configuration device.

At operation 703, the configuration device sends the token information to the service device, and the service device receives the token information.

Details of operations 701 to 703 above may be referred to that of operations 501 to 503 in the embodiment illustrated in FIG. 5, and will not be repeated herein.

In a possible embodiment, the configuration device may acquire the token information of the service device from the cloud device after the service device has completed configuration.

In another possible embodiment, the token information of the service device is obtained from the cloud device after a PASE connection between the service device and the configuration device is established, an authentication process for the service device is performed successfully, and an operation process for operational certificate signing request (OpCSR) is performed successfully, and before network configuration for the service device is completed.

At operation 704, the configuration device forwards a CASE connection establishment message between the service device and the cloud device so that the service device may establish the CASE connection with the cloud device based on the token information.

In the embodiments of the present disclosure, messages for CASE connection establishment between the service device and the cloud device may be forwarded and verified by the configuration device.

In a possible embodiment, before the configuration device forwards the CASE connection establishment message between the service device and the cloud device, the configuration device may send a start pairing request to the cloud device. The start pairing request includes a node ID of the service device, and accordingly, the cloud device receives the start pairing request sent by the configuration device. Then, the cloud device sends a start pairing response to the configuration device based on the start pairing request, and accordingly, the configuration device receives the start pairing response returned by the cloud device. The start pairing response is configured to instruct the cloud device to enter a pending pairing state. The configuration device sends a state indication message to the service device, and accordingly, the service device receives the state indication message sent by the configuration device. The state indication message is configured to indicate that the cloud device enters the pending pairing state. After knowing that the cloud device enters the state, indicating that the cloud device awaits pairing with the service device, the service device may initiate the process of establishing a CASE connection with the cloud device.

In a possible embodiment, the CASE connection establishment message includes a SigmaR1, a SigmaR2, and a SigmaR3. A process where the configuration device forwards the CASE connection establishment message between the service device and the cloud device may include the following operations.

At operation 704*a*, the service device sends a first connection establishment request to the configuration device, and the configuration device receives the first connection establishment request sent by the service device. The first connection establishment request includes a SigmaR1 and a device token of the service device.

The first connection establishment request is configured to instruct the configuration device to send the SigmaR1 to the cloud device based on the device token.

In embodiments of the present disclosure, the service device may send the first connection establishment request to the configuration device when the service device initiates a CASE connection establishment with the cloud device.

At operation 704*b*, the configuration device sends the SigmaR1 to the cloud device based on the device token, and the cloud device receives the SigmaR1 sent by the configuration device based on the device token.

In the embodiment of the present disclosure, the configuration device may determine whether the first connection establishment request is to be sent to the cloud device based on whether the first connection establishment request carries the device token. For example, if the first connection establishment request carries the device token, it is determined that the first connection establishment request is to be sent to the cloud device, and at this time, the configuration device may send the SigmaR1 to the cloud device. Alternatively, the configuration device may further send the SigmaR1 along with the device token to the cloud device.

In some embodiments, if a connection establishment request received by the configuration device does not include the device token, it is determined that the connection establishment request is for CASE connection establishment with the configuration device, and at this time the configuration device may handle the SigmaR1 locally.

In an embodiment of the present disclosure, the configuration device may also verify the first connection establishment request based on the device token. For example, the configuration device may verify whether the device token is issued by the cloud device for the service device. If so, the configuration device passes verification on the first connection establishment request and sends the SigmaR1 to the cloud device. Otherwise, the configuration device fails to pass the verification on the first connection establishment request and may return a response for which the request is failed to the service device.

At operation 704*c*, the cloud device returns a SigmaR2 to the configuration device based on the SigmaR1, and accordingly, the configuration device receives the SigmaR2 returned by the cloud device based on the SigmaR1.

At operation 704*d*, the configuration device sends the SigmaR2 to the service device, and accordingly, the service device receives SigmaR2 sent by the configuration device.

After receiving the SigmaR1 forwarded by the configuration device, the cloud device may handle the SigmaR1, generate the SigmaR2, and return the SigmaR2 to the configuration device. The configuration device forwards the SigmaR2 to the service device.

At operation 704*e*, the service device sends a second connection establishment request to the configuration device based on the SigmaR2, and accordingly, the configuration device receives the second connection establishment request sent by the service device based on the SigmaR2. The second connection establishment request includes a SigmaR3 and the device token of the service device.

The second connection establishment request is configured to instruct the configuration device to send the SigmaR3 to the cloud device based on the device token.

Similar to transmission of the first connection establishment request, in the embodiments of the present disclosure, after generating the SigmaR3 based on the SigmaR2, the service device may send the second connection establishment request, including the SigmaR3 and the device token, to the configuration device. The SigmaR3 is configured to instruct the cloud device to establish a CASE connection with the service device.

At operation 704*f*, the service device establishes the CASE connection with the cloud device.

The service device may establish the CASE connection with the cloud device at the service device after sending the second connection establishment request.

At operation 704*g*, the configuration device sends the SigmaR3 to the cloud device based on the device token, and accordingly, the cloud device receives the SigmaR3 sent by the configuration device based on the device token.

In a possible embodiment, the configuration device sends the SigmaR3 to the cloud device after passing verification on the second connection establishment request through the device token.

At operation 704*h*, the cloud device establishes the CASE connection with the service device.

In the embodiments of the present disclosure, after receiving the SigmaR3, the cloud device may establish the CASE connection with the service device based on the SigmaR3.

In a possible embodiment, the configuration device forwards a CASE connection establishment message between the service device and the cloud device after a PASE connection is established between the service device and the configuration device, an authentication process for the service device is performed successfully, and an operation process for operational certificate signing request (OpCSR) is performed successfully, and before network configuration for the service device is completed. Accordingly, the service device establishes a CASE connection based on the token information with the cloud device after the PASE connection is established between the service device and the configuration device, an authentication process for the service device is performed successfully, and an operation process for operational certificate signing request (OpCSR) is performed successfully, and before network configuration for the service device is completed.

In some embodiments, after the service device completes the network configuration, the service device establishes the CASE connection based on the token information with the cloud device.

In the embodiments of the present disclosure, when the service device establishes a connection with the configuration device, before the service device completes the network configuration, as long as the operation process for OpCSR between the service device and the configuration device is successfully performed, the configuration device may start a process of requesting the token information of the service device from the cloud device and forwarding the CASE connection establishment message between the service device and the cloud device, without waiting for the network configuration of the service device to be completed. After the service device completes the network configuration, the service device may establish the CASE connection with the cloud device timely, so that a duration for establishing the CASE connection between the service device and the cloud device is reduced, an efficiency of establishing the CASE connection between the service device and the cloud device is improved.

In a possible embodiment, after the CASE connection is established between the service device and the cloud device, the service device sends a resource upload request to the cloud device, and accordingly, the cloud device receives the resource upload request sent by the service device through the CASE connection. The resource upload request includes resource information and the device token of the service device.

The cloud device may verify the resource information through the device token, and then establish a digital image of the service device based on the resource information uploaded by the service device after passing verification on the resource information through the device token. Thus, the cloud device or other remote devices may manage and control the service device through the digital image.

Figure 8:
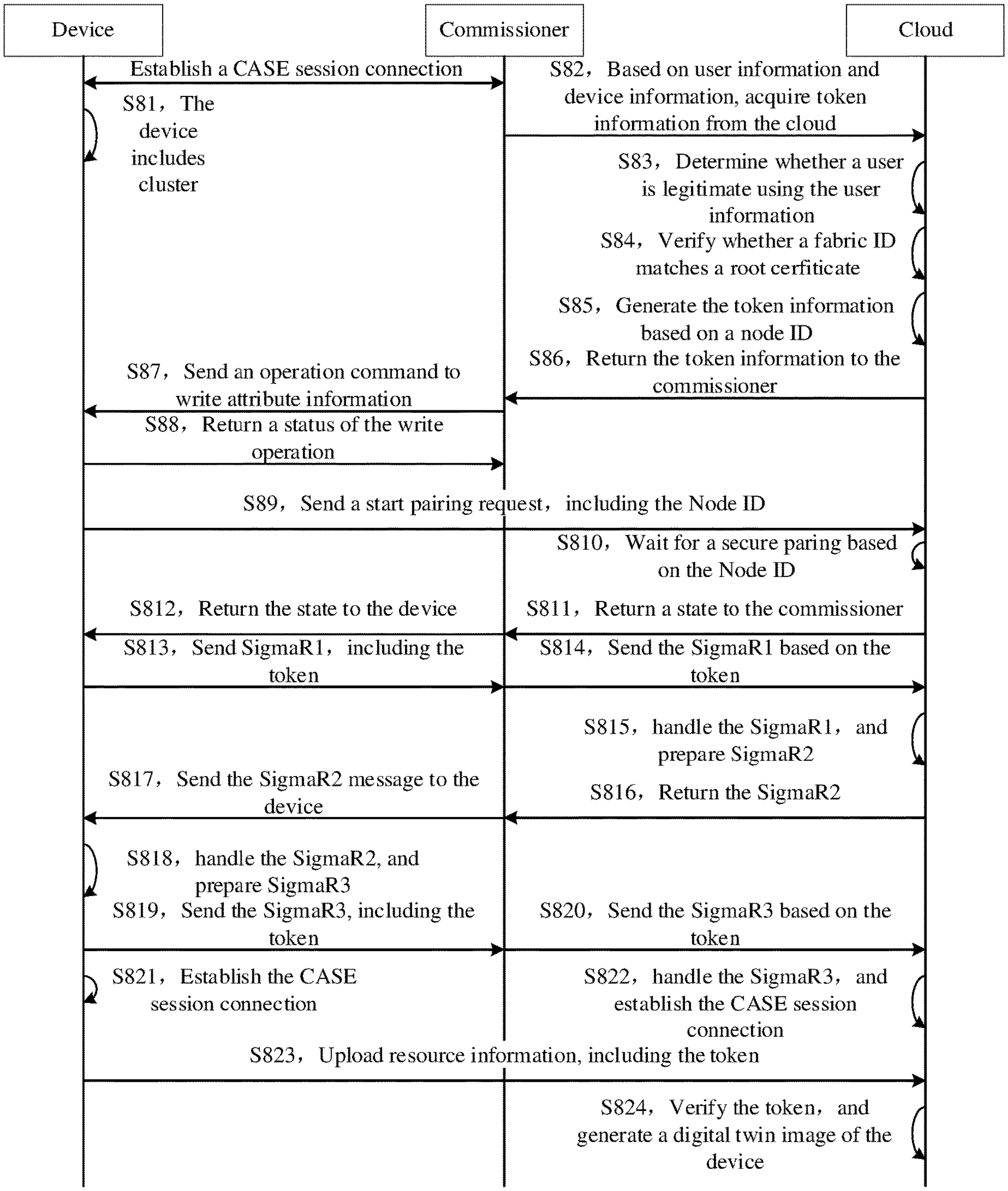
FIG. 8 is a timing diagram of establishing a CASE connection according to an embodiment illustrated in FIG. 7.

For example, FIG. 8 is a timing diagram of establishing a CASE connection according to an embodiment of the present disclosure. In FIG. 8, a process of establishing a CASE connection between the service device and the cloud device may include the following operations.

At operation S81, the device (refer to as the service device) includes a cluster of system models or device management models (refer to as a cloud cluster in the embodiments of the present disclosure), which is configured to configure and store data that interoperates with the cloud (e.g., the above-described cloud device). The cluster at least includes a cloud address attribute, a token attribute, a refresh token attribute, and other attribute information.

At operation S82, when a CASE session connection is established between the device and a commissioner (refer to as the above-described configuration device), the commissioner acquires a token (refer to as the above-described device token) and a refresh token (refer to as the above-described refresh token) of the device from the cloud based on registered user information and device information such as a node ID (refer to as the above-described node ID) and a fabric ID (refer to as the above-described fabric ID).

At operation S83, the cloud determines whether it is a legitimate user based on the user information sent by the commissioner.

At operation S84, the cloud compares the fabric ID (generated by the commissioner for the device) sent by the commissioner with the root certificate of the cloud to determine whether the fabric ID is generated by the root certificate of the cloud.

At operation S85, the cloud generates token information such as token and refresh token for the device based on the node ID sent by the device.

At operation S86, the cloud returns token and refresh token (token information) to the commissioner.

At operation S87, the commissioner sends an operation command to the device to write the cloud address attribute, the token attribute, the refresh token attribute, and other attribute information of the cloud cluster.

At operation S88, after receiving the operation command to write the cloud cluster, the device writes the corresponding attributes and returns a write operation state to the commissioner.

At operation S89: the configuration device sends a start pairing request, including the node ID and other data, to the cloud.

At operation S810, after receiving the start pairing request sent by the commissioner, the cloud start waiting for establishing a secure certificated pairing with the device based on the node ID.

At operation S811, the cloud returns a pending pairing state to the commissioner.

At operation S812, the commissioner returns the pending pairing state to the device.

At operation S813, the device sends a request for sending a SigmaR1 to the commissioner, including the token.

At operation S814, after receiving the request, the commissioner sends the SigmaR1 to the cloud based on corresponding token in the request.

At operation S815, the cloud handles the SigmaR1 and prepares a SigmaR2.

At operation S816, the cloud returns the corresponding SigmaR2 to the commissioner.

At operation S817, the commissioner sends the SigmaR2 to the device.

At operation S818, the device handles the SigmaR2 and prepares a SigmaR3.

At operation S819, the device sends the SigmaR3, including the token, to the commissioner.

At operation S820, the commissioner sends the SigmaR3 to the cloud based on the token.

At operation S821, the device establishes a CASE session connection.

At operation S822, the cloud receives and handles the SigmaR3, and establishes the CASE session connection.

At operation S823, after the CASE session connection is successfully established between the device and the cloud, the device spontaneously uploads resource information of the device to the cloud, including the token.

At operation S824, the cloud verifies the token and generates a digital twin image of the device at the cloud.

One or more of the operations S81 to S822 above may be performed after a PASE connection is established between the device and the commissioner, an authentication process for the device is performed successfully, and an operation process for operational certificate signing request (OpCSR) is performed successfully, and before network configuration for the device is completed. Alternatively, one or more of the operations S81 to S822 above may be performed after network configuration for the device is completed.

In embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

Besides, in the embodiments of the present embodiments, the configuration device obtains the token information of the service device from the cloud device, and sends the token information of the service device to the service device. The configuration device forwards a CASE connection establishment message between the service device and the cloud device. Since a secure connection is established between the service device and the configuration device, the embodiments of the present disclosure may enhance a transmission security of the CASE connection establishment message between the cloud device and the service device.

Some embodiments of an apparatus illustrated in the present disclosure are provided as follows and may be used to perform the embodiments of the methods illustrated in the present disclosure. Details that are not disclosed in the embodiments of the apparatus may be referred to the embodiments of method in the present disclosure.

Figure 9:
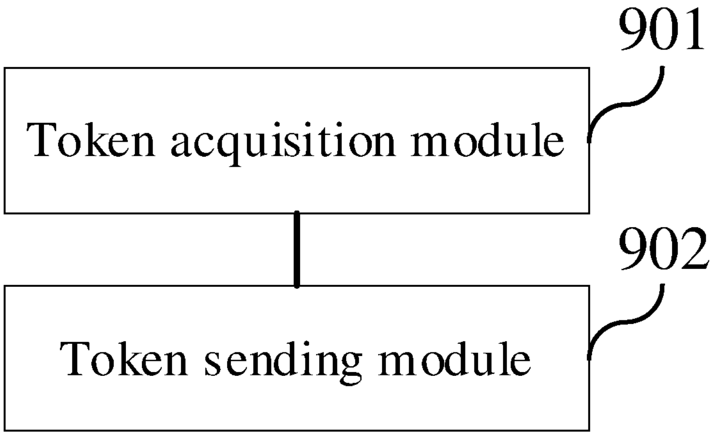
FIG. 9 is a structural block view of an apparatus for connection establishment according to an embodiment of the present disclosure.

FIG. 9 is a structural block view of an apparatus for connection establishment according to an embodiment of the present disclosure. The apparatus includes a function to realize the embodiments of the method for connection establishment. The function may be realized by a hardware only or by a hardware to execute a corresponding software. The apparatus may be the configuration device as described above or may be arranged in the configuration device. In FIG. 9, the apparatus may include the following modules.

A token acquisition module 901 may be configured to obtain the token information of the service device from the cloud device;

A token sending module 902 may be configured to send the token information to the service device. A CASE connection is established between the service device and the cloud device based on the token information.

In a possible embodiment, the token acquisition module 901 may include the following sub-modules.

An acquisition request sending sub-module may be configured to send the token acquisition request to cloud device. The token acquisition request includes the first verification information.

A token acquisition sub-module may be configured to acquire the token information sent by the cloud device after the cloud device passes verification on the first verification information.

In a possible embodiment, the first verification information includes at least one of the user information of the configuration device and the fabric ID of the service device.

In a possible embodiment, the apparatus further includes the following module.

A fabric ID generation module may be configured to generate the fabric ID of the service device corresponding to the root CA of the cloud device.

In a possible embodiment, the fabric ID is configured for the cloud device to obtain a verification result. The verification result is configured to indicate whether the fabric ID is generated according to the root certificate.

In a possible embodiment, the token acquisition request further includes the node ID of the service device.

In a possible embodiment, the token information includes a device token.

In a possible embodiment, the token information further includes at least one of the refresh token and the address of the cloud device.

The refresh token is configured to refresh the device token.

In a possible embodiment, the token acquisition request further includes the node ID of the service device. The cloud device generates the device token and/or the refresh token based on the node ID.

In a possible embodiment, the token sending module 902 is configured to send the write operation message, including the token information, to the service device. The write operation message is configured to instruct the service device to write the token information into the model information cluster in the service device. The model information cluster is configured to store the information related to the cloud operation.

In a possible embodiment, the write operation message is configured to instruct the service device to write the token information into attribute information in the model information cluster.

In a possible embodiment, the apparatus further includes the following module.

A message forwarding module may be configured to forward messages for CASE connection establishment between the service device and the cloud device.

In a possible embodiment, the message for CASE connection establishment includes the SigmaR1, the SigmaR2, and the SigmaR3. The message forwarding module may be configured to: receive the first connection establishment request sent by the service device, and the first connection establishment request includes the SigmaR1 and the device token of the service device; send the SigmaR1 to the cloud device based on the device token; receive the SigmaR2, the SigmaR2 being returned by the cloud device based on the SigmaR1; send the SigmaR2 to the service device; receive the second connection establishment request, the second connection establishment request being sent by the service device based on the SigmaR2 and including the SigmaR3 and the device token of the service device; and send the SigmaR3 to the cloud device based on the device token.

In a possible embodiment, the apparatus further includes the following modules.

A pairing request sending module may be configured to send a start pairing request to the cloud device before the message forwarding module forwards the CASE connection establishment message between the service device and the cloud device. The start pairing request includes the node ID of the service device.

A pairing response receiving module may be configured to receive the start pairing response returned by the cloud device. The start pairing response is configured for indicating the cloud device to enter the pending pairing state.

A state indication module may be configured to send the state indication message to the service device. The state indication message may be configured to indicate that the cloud device enters the pending pairing state.

In a possible embodiment, the token acquisition module 901 may be configured to acquire the token information of the service device from the cloud device, after a PASE connection between the service device and the configuration device is established, an authentication process for the service device is performed successfully, and an operation process for operational certificate signing request (OpCSR) is performed successfully, and before network configuration for the service device is completed.

In a possible embodiment, the message forwarding module may be configured to forward the CASE connection establishment message between the service device and the cloud device, after a PASE connection between the service device and the configuration device is established, an authentication process for the service device is performed successfully, and an operation process for operational certificate signing request (OpCSR) is performed successfully, and before network configuration for the service device is completed.

In the technical solutions provided by the embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

Figure 10:
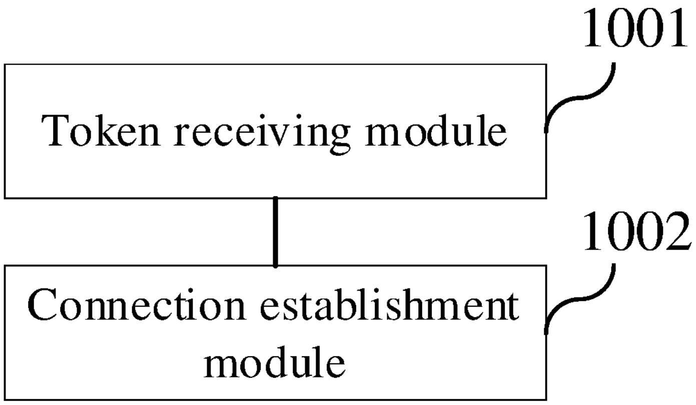
FIG. 10 is a structural block view of an apparatus for connection establishment according to an embodiment of the present disclosure.

FIG. 10 is a structural block view of an apparatus for connection establishment according to an embodiment of the present disclosure is provided. The apparatus includes a function to realize the embodiments of the method for connection establishment. The function may be realized by a hardware only or by a hardware to execute a corresponding software. The apparatus may be the configuration device as described above or may be arranged in the configuration device. In FIG. 10, the apparatus may include the following modules.

A token receiving module 1001 may be configured to receive the token information of the service device sent by the configuration device. The token information is obtained by the configuration device from the cloud device.

A connection establishment module 1002 may be configured to establish the CASE connection with the cloud device based on the token information.

In a possible embodiment, the token information includes a device token.

In a possible embodiment, the token information further includes at least one of a refresh token and the address of the cloud device.

The refresh token may be configured to refresh the device token.

In a possible embodiment, the service device includes the model information cluster. The model information cluster may be configured to store the information related to the cloud operation. The token receiving module 1001 may be configured to receive the write operation message, including the token information, sent by the configuration device. According to the write operation message, the token information is written into the model information cluster in the service device.

In a possible embodiment, the writing the token information into the model information cluster according to the write operation message, may include: writing the token information into the attribute information in the model information cluster based on the write operation message.

In a possible embodiment, the connection establishment module 1002 may be configured to: send the first connection establishment request to the cloud device, the first connection establishment request includes the SigmaR1 and the device token of the service device, and the cloud device verifies the connection establishment request sent by the configuration device based on the device token; receive the SigmaR2, the SigmaR2 being returned by the cloud device based on the SigmaR1; send the second connection establishment request to the cloud device, the second connection establishment request includes the SigmaR3 and the device token of the service device; and establish the CASE connection with the cloud device.

In a possible embodiment, the connection establishment module 1002, may be further configured to establish the PCT/UCP connection with the cloud device based on the address of the cloud device, before sending the first connection establishment request to the cloud device.

In a possible embodiment, the connection establishment module 1002 may be configured to: send the first connection establishment request to the configuration device, the first connection establishment request includes the SigmaR1 and the device token of the service device, and the first connection establishment request is configured to instruct the configuration device to send the SigmaR1 to the cloud device based on the device token; receive the SigmaR2, the SigmaR2 being sent by the configuration device and being returned by the cloud device to the configuration device based on the SigmaR1; send the second connection establishment request to the configuration device based on the SigmaR2, the second connection establishment request includes the SigmaR3 and the device token of the service device, the second connection establishment request is configured to instruct the configuration device to send the SigmaR3 to the cloud device based on the device token, and the SigmaR3 is configured to instruct the cloud device to establish the CASE connection with the service device; and establish the CASE connection with the cloud device.

In a possible embodiment, the connection establishment module 1002 is further configured to receive a state indication message from the configuration device before sending the first connection establishment request to the configuration device, and the state indication message is configured to indicate that the cloud device enters the pending pairing state.

In a possible embodiment, the connection establishment module 1002 may be configured to establish the CASE connection with the cloud device based on the token information, after a PASE connection between the service device and the configuration device is established, an authentication process for the service device is performed successfully, and an operation process for operational certificate signing request (OpCSR) is performed successfully, and before network configuration for the service device is completed.

In a possible embodiment, the apparatus further includes an upload module, which may be configured to send the resource upload request to the cloud device. The resource upload request includes the resource information and the device token of the service device.

In the embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

Figure 11:
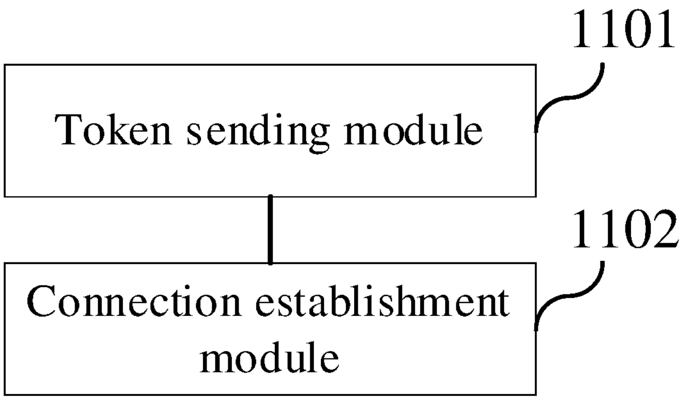
FIG. 11 is a structural block view of an apparatus for connection establishment according to an embodiment of the present disclosure.

FIG. 11 is a structural block view of an apparatus for connection establishment according to an embodiment of the present disclosure. The apparatus includes a function to realize the embodiments of the method for connection establishment. The function may be realized by a hardware only or by a hardware to execute a corresponding software. The apparatus may be the configuration device as described above or may be arranged in the configuration device. In FIG. 11, the apparatus may include the following modules.

A token sending module 1101 may be configured to send the token information of the service device to the configuration device. The token information is sent by the configuration device to the service device.

A connection establishment module 1102 may be configured to establish the CASE connection based on the token information with the service device.

In a possible embodiment, the token sending module 1101 may include the following sub-modules.

An acquisition request receiving sub-module may be configured to receive the token acquisition request sent by the configuration device. The token acquisition request includes the first verification information;

A verification sub-module may be configured to perform a verification based on the first verification information.

A token sending sub-module may be configured to send the token information to the configuration device after the cloud device passes verification on the first verification information.

In a possible embodiment, the first verification information includes at least one of the user information of the configuration device and the fabric ID of the service device. The fabric ID is generated for the service device based on the root certificate of the cloud device.

The verification sub-module may be configured to: verify whether the user information is legitimate when the first verification information includes the user information of the configuration device; and verify whether the fabric ID matches the root certificate of the cloud device when the first verification information includes the fabric ID of the service device.

In a possible embodiment, the fabric ID may be configured for the verification sub-module to obtain the verification result when the first verification information includes the fabric ID of the service device. The verification result may be configured to indicate whether the fabric ID is generated according to the root certificate.

In a possible embodiment, the token information includes the device token.

In a possible embodiment, the token information further includes at least one of the refresh token and the address of the cloud device.

The refresh token is configured to refresh the device token.

In a possible embodiment, the token acquisition request further includes the node ID of the service device, and the apparatus further includes a token generation module, which may be configured to generate the device token and/or the refresh token based on the node ID after the cloud device passes verification on the first verification information.

In a possible embodiment, the connection establishment module 1102 is configured to: receive the first connection establishment request sent by the service device, and the first connection establishment request includes the SigmaR1 and the device token of the service device; return the SigmaR2 to the service device based on the SigmaR1 after the SigmaR1 is verified based on the device token; receive the second connection establishment request, the second connection establishment request being sent by the service device based on the SigmaR2 and comprising the SigmaR3 and the device token of the service device; and establish the CASE connection with the service device after the SigmaR3 is verified based on the device token.

In a possible embodiment, the connection establishment module 1102 may be further configured to establish the TCP/UDP connection with the service device before receiving the first connection establishment request sent by the service device.

In a possible embodiment, the connection establishment module 1102 may be configured to: receive the SigmaR1 sent by the configuration device based on the device token, the SigmaR1 and the device token are carried in the first connection establishment request sent by the service device to the configuration device; return the SigmaR2 to the configuration device based on the SigmaR1, so that the configuration device sends the SigmaR2 to the service device; receive the SigmaR3 sent by the configuration device based on the device token, the SigmaR3 and the device token are carried in the second connection establishment request sent by the service device to the configuration device based on the SigmaR2 forwarded by the configuration device; and establish the CASE connection with the service device.

In a possible embodiment, before receiving the SigmaR1 sent by the configuration device based on the device token, the connection establishment module 1102 may further be configured to: receive the start pairing request sent by the configuration device and the start pairing request includes a node ID of the service device; and send the start pairing response to the configuration device, the start pairing response is configured for indicating the cloud device to enter the pending pairing state.

In a possible embodiment, the apparatus further includes the following modules.

An upload request receiving module may be configured to receive the resource upload request sent by the service device through the CASE connection. The resource upload request includes the resource information and the device token of the service device.

Am image establishment module may be configured to establish the digital image of the service device in the cloud based on the resource information after the resource information is verified based on the device token.

In the embodiments of the present disclosure, after the connection is established between the configuration device and the service device, the configuration device may request the token information corresponding to the service device from the cloud device, and may then send the token information to the service device, so that the CASE connection may be established between the service device and the cloud device. The service device may then be remotely managed and controlled by the cloud device or other user devices connected to the cloud device through the CASE connection with the cloud device, and thus a scenario where the service device is managed and controlled may be greatly expanded to improve the convenience of the management and the controls of the service device.

In addition, since the CASE connection achieves a better security because of the TCP/UDP protocol, the technical solutions provided in the present disclosure may ensure the secure connection between the service device and the cloud device, and thereby improve a security of the service device in receiving the management or the controls by the cloud device.

The apparatus provided in the above embodiments is implemented based on a division of previously mentioned modules as an example. In a real-world scenario, the above-described functions can be assigned to be completed by different modules according to the actual needs. That is, a content structure of the apparatus may be divided into the different modules in order to complete all or a part of functions.

With respect to the apparatus in the above embodiments, the specific manner in which each module performs an operation has been described in detail in the embodiments the methods, and will not be repeated herein.

Figure 12:
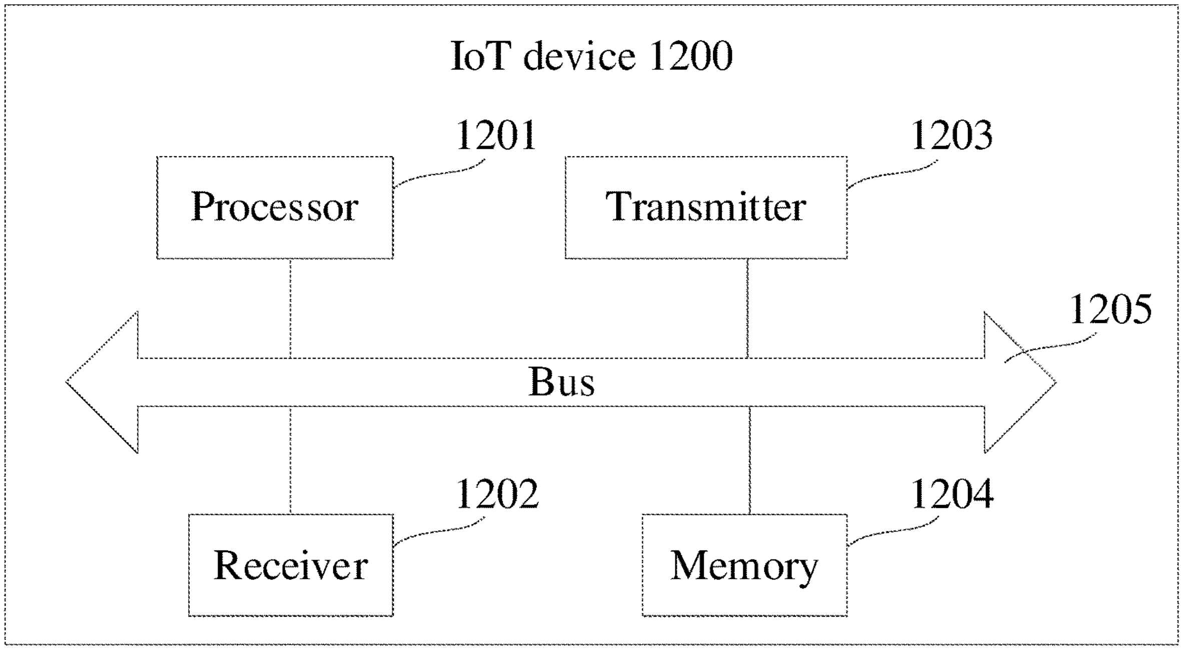
FIG. 12 is a structural view of an IoT device according to an embodiment of the present disclosure.

FIG. 12 is a structural block view of an IoT device 1200 according to an embodiment of the present disclosure. The IoT device 1200 may include: a processor 1201, a receiver 1202, a transmitter 1203, a memory 1204, and a bus 1205.

The processor 1201 includes one or more processing cores, and the processor 1201 performs various functional applications and information processing by running software programs and modules.

The receiver 1202 and the transmitter 1203 may be realized as a communication component, which may be a communication chip. The communication chip may also be referred to as a transceiver.

The memory 1204 is connected to the processor 1201 through a bus 1205.

The memory 1204 may be configured to store a computer program, and the processor 1201 is configured to execute the computer program to implement each operation performed by the terminal in the embodiments of the methods described above.

In addition, the memory 1204 may be implemented by any type of a volatile or a non-volatile storage device or a combination thereof. The volatile or non-volatile storage device includes, but is not limited to: a disk or optical disks, an electrically erasable programmable read-only memory, an erasable programmable read-only memory, a static ready-to-access memory, a read-only memory, a magnetic memory, a flash memory, and a programmable read-only memory.

In some embodiments, the IoT device includes a processor, a memory, and a transceiver (which may include a receiver and a transmitter, the receiver is configured to receive information, and the transmitter is configured to send information);

In a case where the IoT device is realized as a configuration device, the transceiver is configured to obtain the token information of the service device from the cloud device; and the transceiver is further configured to send the token information to the service device, and the CASE connection is established between the service device and the cloud device based on the token information.

When the IoT device in the embodiments of the present disclosure is realized as the configuration device, all or some of the operations performed by the configuration device in the methods of connection establishment illustrated in FIG. 2, FIG. 5, or FIG. 7 above, which will not be repeated herein.

In a case where the IoT device is realized as a service device, the transceiver is configured to receive the token information of the service device sent by the configuration device, the token information is obtained by the configuration device from the cloud device; the transceiver is further configured to establish the CASE connection with the cloud device based on the token information.

When the IoT device in the embodiments of the present disclosure is realized as the service device, all or some of the operations performed by the service device in the methods of the connection establishment illustrated in FIG. 3, FIG. 5, or FIG. 7 above may be performed, and will not be repeated herein.

In a case where the IoT device is realized as a cloud-based device, the transceiver is configured to send the token information of the service device to the configuration device, and the token information is sent by the configuration device to the service device; the transceiver is further configured to establish the CASE connection between the service device based on the token information.

When the IoT device in the embodiments of the present disclosure is realized as a cloud device, all or some of the operations performed by the cloud device in the methods of the connection establishment illustrated in FIG. 4, FIG. 5, or FIG. 7 above may be performed, and will not be repeated herein.

The embodiments of the present disclosure also provide a computer-readable storage medium and the storage medium stores a computer program. The computer program is loaded and executed by the processor to cause the processor to perform a part of the operations performed by the configuration device, the service device, or the cloud device in the methods of the connection establishment provided in FIG. 2, FIG. 3, FIG. 4, FIG. 5 or FIG. 7 above.

The present disclosure also provides a chip that is configured to be operated in an IoT device to cause the IoT device to perform a part of the operations performed by the configuration device, the service device, or the cloud device in the methods of the connection establishment illustrated in FIG. 2, FIG. 3, FIG. 4, FIG. 5, or FIG. 7 above.

The present disclosure further provides a computer program product. The computer program product or a computer program includes computer instructions that are stored in the computer-readable storage medium. A processor of the IoT device reads the computer instructions from the computer-readable storage medium, and the processor executes the computer instructions to cause the IoT device to perform a part of the operations performed by the configuration device, the service device, or the cloud device in the methods of the connection establishment illustrated above in FIG. 2, FIG. 3, FIG. 4, FIG. 5, or FIG. 7.

The present disclosure further provides a computer program that is executed by a processor of an IoT device to cause the processor to perform a part of the operations in the methods of the connection establishment illustrated in FIG. 2, FIG. 3, FIG. 4, FIG. 5, or FIG. 7 above that is performed by the configuration device, the service device, or the cloud-side device.

Those skilled in the art should understand that in one or more of the examples above, a function described in the embodiments of the present disclosure may be implemented using hardware, software, firmware, or any combination thereof. When the function is implemented using the software, the function may be stored in the computer-readable medium or transmitted as one or more instructions or code in a computer-readable medium. The computer-readable medium may include a computer storage medium and a communication medium. The communication medium may include any medium that facilitates a transmission of a computer program from one location to another location. The storage medium may be any available medium that is able to be accessed by a general computer or a specialized computer.

What have been mentioned above are merely some embodiments of the present disclosure and are not intended to limit the present disclosure. Any modifications, equivalent substitutions, improvements, etc. made within the spirit and principles of the present disclosure shall be included in the scope of the present disclosure.

What is claimed is:

1. A method for connection establishment, performed by a configuration device, comprising:

acquiring token information of a service device from a cloud device; and sending a write operation message comprising the token information to the service device, the token information being configured for establishing a certificate authenticated session establishment (CASE) connection between the service device and the cloud device; wherein the write operation message is configured to instruct the service device to write the token information into a model information cluster in the service device, and the model information cluster is configured to store information related to a cloud operation.

2. The method as claimed in claim 1, wherein the acquiring token information of a service device from a cloud device, comprises:

sending a token acquisition request to the cloud device, the token acquisition request comprising first verification information; and acquiring the token information from the cloud device, the token information being sent by the cloud device in response to the cloud device passing verification on the first verification information.

3. The method as claimed in claim 2, wherein the first verification information comprises at least one of user information of the configuration device and a fabric ID of the service device.

4. The method as claimed in claim 3, further comprising:

generating the fabric ID corresponding to a root certificate of the cloud device.

5. The method as claimed in claim 4, wherein the fabric ID is configured for the cloud device to obtain a verification result, and the verification result is configured to indicate whether the fabric ID is generated based on the root certificate.

6. The method as claimed in claim 1, wherein the token information comprises a device token of the service device.

7. The method as claimed in claim 6, wherein the token information further comprises at least one of:

a refresh token, configured to refresh the device token, and an address of the cloud device.

8. The method as claimed in claim 6, wherein the token acquisition request further comprises a node ID of the service device, and the node ID is information based on which the cloud device generates the device token and/or the refresh token.

9. The method as claimed in claim 1, wherein the write operation message is configured to instruct the service device to write the token information into attribute information in the model information cluster.

10. The method as claimed in claim 1, further comprising:

forwarding messages for CASE connection establishment between the service device and the cloud device.

11. The method as claimed in claim 10, wherein the messages for CASE connection establishment message comprises a first connection establishment message (SigmaR1), a second connection establishment message (SigmaR2), and a third connection establishment message (SigmaR3);

the forwarding messages for CASE connection establishment between the service device and the cloud device, comprises:

receiving a first connection establishment request sent by the service device, the first connection establishment request comprising the SigmaR1 and a device token of the service device;

sending the SigmaR1 to the cloud device based on the device token;

receiving the SigmaR2, the SigmaR2 being returned by the cloud device based on the SigmaR1;

sending the SigmaR2 to the service device;

receiving a second connection establishment request, the second connection establishment request being sent by the service device based on the SigmaR2 and comprising the SigmaR3 and the device token of the service device; and sending the SigmaR3 to the cloud device based on the device token.

12. The method as claimed in claim 10, before the forwarding messages for CASE connection establishment between the service device and the cloud device, further comprising:

sending a start pairing request to the cloud device, the start pairing request comprising a node ID of the service device;

receiving a start pairing response returned by the cloud device, the start pairing response being configured to indicate that the cloud device is in a pending pairing state; and sending a state indication message to the service device, the state indication message being configured to indicate that the cloud device is in the pending pairing state.

13. The method as claimed in claim 1, wherein the acquiring token information of a service device from a cloud device, comprises:

acquiring the token information of the service device from the cloud device, after a password authenticated session establishment (PASE) connection is established between the service device and the configuration device, an authentication process for the service device is performed successfully, and an operation process for operational certificate signing request (OpCSR) is performed successfully, and before network configuration for the service device is completed.

14. The method as claimed in claim 10, wherein the forwarding messages for CASE connection establishment message between the service device and the cloud device, comprises:

forwarding the messages for CASE connection establishment between the service device and the cloud device, after a password authenticated session establishment (PASE) connection is established between the service device and the configuration device, an authentication process for the service device is performed successfully, and an operation process for operational certificate signing request (OpCSR) is performed successfully, and before network configuration for the service device is completed.

15. A method for connection establishment, performed by a service device, comprising:

receiving a write operation message comprising token information of the service device sent by a configuration device, the token information being acquired by the configuration device from a cloud device: wherein the service device comprises a model information cluster, and the model information cluster is configured to store information related to a cloud operation;

writing the token information into the model information cluster based on the write operation message; and establishing a CASE connection with the cloud device based on the token information.

16. The method as claimed in claim 15, wherein the token information comprises a device token of the service device.

17. The method as claimed in claim 16, wherein the token information comprises at least one of:

a refresh token, configured to refresh the device token, and an address of the cloud device.

18. An Internet of Things (IoT) device, realized as a configuration device, comprising a processor, a memory, and a transceiver;

wherein the transceiver is configured to acquire token information of a service device from a cloud device, after a connection is established with the service device; and wherein the transceiver is further configured to send a write operation message comprising the token information to the service device, the token information being configured for establishing a CASE connection between the service device and the cloud device; wherein the write operation message is configured to instruct the service device to write the token information into a model information cluster in the service device, and the model information cluster is configured to store information related to a cloud operation.

19. The method as claimed in claim 15, wherein the writing the token information into the model information cluster based on the write operation message, comprises:

writing the token information into attribute information in the model information cluster based on the write operation message.

20. The IoT device as claimed in claim 18, wherein the write operation message is configured to instruct the service device to write the token information into attribute information in the model information cluster.

* * * * *